(12) United States Patent
Zhou et al.

(10) Patent No.: US 12,298,856 B2
(45) Date of Patent: May 13, 2025

(54) FULL BACKUP METHOD AND APPARATUS FOR DISTRIBUTED DATABASE SYSTEM, AND COMPUTER-READABLE STORAGE MEDIUM

(71) Applicant: China UnionPay Co., Ltd., Shanghai (CN)

(72) Inventors: Jiajing Zhou, Shanghai (CN); Hao Miao, Shanghai (CN); Jien Zhou, Shanghai (CN)

(73) Assignee: China UnionPay Co., Ltd., Shanghai (CN)

( * ) Notice: Subject to any disclaimer, the term of this patent is extended or adjusted under 35 U.S.C. 154(b) by 96 days.

(21) Appl. No.: 18/016,664

(22) PCT Filed: Mar. 4, 2021

(86) PCT No.: PCT/CN2021/078983
§ 371 (c)(1),
(2) Date: Jan. 17, 2023

(87) PCT Pub. No.: WO2022/041672
PCT Pub. Date: Mar. 3, 2022

(65) Prior Publication Data
US 2023/0297478 A1    Sep. 21, 2023

(30) Foreign Application Priority Data

Aug. 24, 2020 (CN) .......................... 202010858530.5

(51) Int. Cl.
*G06F 11/14* (2006.01)
*G06F 16/27* (2019.01)

(52) U.S. Cl.
CPC ...... *G06F 11/1451* (2013.01); *G06F 11/1458* (2013.01); *G06F 16/27* (2019.01); *G06F 2201/84* (2013.01)

(58) Field of Classification Search
None
See application file for complete search history.

(56) References Cited

U.S. PATENT DOCUMENTS

| 7,778,972 B1 | 8/2010 | Cormie et al. |
| 2008/0228834 A1* | 9/2008 | Burchall ............. G06F 11/2038 |

(Continued)

FOREIGN PATENT DOCUMENTS

| CN | 105630626 | 6/2016 |
| CN | 106610876 A | 5/2017 |

(Continued)

OTHER PUBLICATIONS

International Search Report dated Jun. 15, 2021, for PCT/CN2021/078983, 5 pp.

(Continued)

*Primary Examiner* — Belix M Ortiz Ditren
(74) *Attorney, Agent, or Firm* — Nixon & Vanderhye P.C.

(57) ABSTRACT

The present invention provides a method and an apparatus for performing a full backup for a distributed database system, and a computer-readable storage medium. Said method comprises: acquiring full backup data of each data node in the distributed database system, with a full-backup time point corresponding to the full backup data being a time point; determining a trust divergence time point for the time point, where all transactions in prepared states prior to the trust divergence time point are enabled to be committed or rolled back before the time point; acquiring a first incremental log set of said each data node between the trust divergence time point and the time point; acquiring from the first incremental log set a pending transaction of said each data node; and replaying the pending transaction of said each data node on the full backup data of said each data node.

20 Claims, 4 Drawing Sheets

(56) References Cited

U.S. PATENT DOCUMENTS

| | | | | |
|---|---|---|---|---|
| 2011/0093440 A1* | 4/2011 | Asakura | ............... | G06F 11/1471 |
| | | | | 707/685 |
| 2015/0213286 A1* | 7/2015 | Summers | ................ | G06F 21/10 |
| | | | | 726/26 |
| 2016/0147614 A1* | 5/2016 | Mittal | ................. | G06F 11/1446 |
| | | | | 707/615 |
| 2017/0220621 A1* | 8/2017 | Colrain | ............... | G06F 11/0745 |
| 2020/0073768 A1* | 3/2020 | Jolad | ................... | G06F 11/2097 |
| 2024/0211488 A1* | 6/2024 | Han | ...................... | G06F 16/273 |

FOREIGN PATENT DOCUMENTS

| | | |
|---|---|---|
| CN | 110309227 | 10/2019 |
| CN | 111078667 A | 4/2020 |
| CN | 112000521 | 11/2020 |
| CN | 112000522 | 11/2020 |

OTHER PUBLICATIONS

Written Opinion of the ISA dated Jun. 15, 2021, for PCT/CN2021/078983, 5 pp.
Examination Report mailed Aug. 7, 2023 in Australian Application No. 2021330430, 3 pages.
First Office Action mailed Jun. 24, 2021 in Chinese Application No. 202010858530.5, with English machine translation, 12 pages.

* cited by examiner

FULL BACKUP METHOD AND APPARATUS FOR DISTRIBUTED DATABASE SYSTEM, AND COMPUTER-READABLE STORAGE MEDIUM

This application is the U.S. national phase of International Application No. PCT/CN2021/078983 filed Mar. 4, 2021 which designated the U.S. and claims priority to CN 202010858530.5 filed Aug. 24, 2020, the entire contents of each of which are hereby incorporated by reference.

TECHNICAL FIELD

The present disclosure belongs to the field of computer technologies, in particular to a method and an apparatus for performing a full backup for a distributed database system, and a computer-readable storage medium.

BACKGROUND

This section is intended to provide background or context to the embodiments of the present disclosure as set forth in claims. What is described herein is not admitted to be prior art by virtue of its inclusion in this section.

A distributed database may have data stored across a plurality of nodes (generally referred to as data nodes). FIG. 1 shows a distributed database system, where the distributed database system 100 includes a coordinator node 101, a plurality of data nodes 102, and a plurality of clients. The coordinator node 101 may handle distributed transactions with the following logic. In case a global transaction involves only one data node, the data node may just commit the transaction by using a one-phase commit protocol. Of course, the transaction may also be committed by using a two-phase commit protocol, which however may result in a relatively poor processing performance and increase the probability of failure. In case the global transaction involves a plurality of data nodes, a two-phase commit protocol (or a three-phase commit protocol) may be used to start the branch transactions at the data nodes. Specifically, the branch transactions are controlled by the coordinator to enter into prepared states, and one global transaction log (containing information about the branch transactions corresponding to the global transaction) is recorded after all the branch transactions are in the prepared states. In case the global transaction is successfully logged (i.e., the global transaction is supposed to succeed), the branch transactions in the prepared states would start to be committed until they are all successfully committed; and in case the global transaction fails to be logged (i.e., the global transaction is supposed to eventually fail), all branch transactions would be rolled back.

However, branch transactions in the prepared states are generally not logged when a full backup is performed on each data node at a certain time point. In other words, a certain branch transaction cannot be backed up in case the full-backup time point (at which the full backup is performed) falls between a prepare log flush and a commit log flush of the branch transaction.

SUMMARY

In view of the aforesaid problems in the related art, proposed are a method and an apparatus for performing a full backup for a distributed database system, and a computer-readable storage medium, that can solve the aforesaid problems.

The present disclosure provides the following solutions.

In a first aspect, provided is a method of performing a full backup for a distributed database system including a plurality of data nodes. The method includes: acquiring full backup data of each data node in the distributed database system, with a full-backup time point corresponding to the full backup data being a first time point; determining a trust divergence time point for the first time point, where all transactions in prepared states prior to the trust divergence time point are enabled to be committed or rolled back before the first time point; acquiring a first incremental log set of said each data node between the trust divergence time point and the first time point; acquiring from the first incremental log set a pending transaction of said each data node, the pending transaction being in a prepared state but not committed or rolled back; and replaying the pending transaction of said each data node on the full backup data of said each data node.

In a possible implementation, acquiring the full backup data of each data node in the distributed database system includes: taking a data node snapshot for said each data node at the first time point, and recording currently imported data of said each data node as the full backup data.

In a possible implementation, determining the trust divergence time point for the first time point includes: acquiring an incremental log of said each data node based on the first time point; and determining prepare time points and commit time points of a plurality of branch transactions based on the incremental log of said each data node, and determining the trust divergence time point for the first time point based on the prepare time points and the commit time points of the plurality of branch transactions.

In a possible implementation, the method further includes: determining branch transaction commit durations based on the prepare time points and the commit time points of the plurality of branch transactions; acquiring a branch transaction commit duration longer than a predetermined time length, and recording a prepare time point and a commit time point of a branch transaction corresponding to the branch transaction commit duration into a branch transaction time-consumption table; and determining the trust divergence time point for the first time point based on the branch transaction time-consumption table.

In a possible implementation, determining the trust divergence time point for the first time point based on the branch transaction time-consumption table includes: searching the branch transaction time-consumption table for any branch transaction matching a predetermined condition, where the predetermined condition is that the prepare time point is prior to t1-s and the commit time point is later than t1, t1 being the first time point and s being the predetermined time length; where in case at least one branch transaction matching the predetermined condition is present in the branch transaction time-consumption table, an earliest prepare time point is selected for the at least one branch transaction matching the predetermined condition to serve as the trust divergence time point for the first time point; and where in case no branch transaction matching the predetermined condition is present in the branch transaction time-consumption table, the trust divergence time point for the first time point is determined as t1-s, t1 being the first time point and s being the predetermined time length.

In a second aspect, provided is another method of performing a full backup for a distributed database system including a plurality of data nodes. The method includes: performing a full backup for each data node in the distributed database system at a second time point to acquire full backup data, and determining a finish time point of the full backup as a third time point; determining a trust divergence time point for the second time point, where all transactions in prepared states prior to the trust divergence time point are enabled to be committed or rolled back before the second time point; acquiring a second incremental log set of said each data node between the trust divergence time point and a fourth time point, where the fourth time point is any time point after the third time point; and performing a fault-tolerant replay of the second incremental log set on the second full backup data.

In a possible implementation, determining the trust divergence time point for the second time point includes: acquiring an incremental log of said each data node based on the second time point; and determining prepare time points and commit time points of a plurality of branch transactions based on the incremental log of said each data node, and determining the trust divergence time point for the second time point based on the prepare time points and the commit time points of the plurality of branch transactions.

In a possible implementation, the method further includes: determining branch transaction commit durations based on the prepare time points and the commit time points of the plurality of branch transactions; acquiring a branch transaction commit duration longer than a predetermined time length, and recording a prepare time point and a commit time point of a branch transaction corresponding to the branch transaction commit duration into a branch transaction time-consumption table; and determining the trust divergence time point for the second time point based on the branch transaction time-consumption table.

In a possible implementation, determining the trust divergence time point for the second time point based on the branch transaction time-consumption table includes: searching the branch transaction time-consumption table for any branch transaction matching a predetermined condition, where the predetermined condition is that the prepare time point is prior to t2-s and the commit time point is later than t2, t2 being the second time point and s being the predetermined time length; where in case at least one branch transaction matching the predetermined condition is present in the branch transaction time-consumption table, an earliest prepare time point is selected for the at least one branch transaction matching the predetermined condition to serve as the trust divergence time point for the second time point; and where in case no branch transaction matching the predetermined condition is present in the branch transaction time-consumption table, the trust divergence time point for the second time point is determined as t2-s, t2 being the second time point and s being the predetermined time length.

In a possible implementation, performing the fault-tolerant replay of the second incremental log set on the second full backup data includes: performing write conflict processing on recorded data during the replay.

In a third aspect, provided is an apparatus for performing a full backup for a distributed database system including a plurality of data nodes. The apparatus includes: a first backup unit configured to acquire full backup data of each data node in the distributed database system, with a full-backup time point corresponding to the full backup data being a first time point; a first determination unit configured to determine a trust divergence time point for the first time point, where all transactions in prepared states prior to the trust divergence time point are enabled to be committed or rolled back before the first time point; a first acquisition unit configured to acquire a first incremental log set of said each data node between the trust divergence time point and the first time point, and acquire from the first incremental log set a pending transaction of said each data node, the pending transaction being in a prepared state but not committed or rolled back; and a first replay unit configured to replay the pending transaction of said each data node on the full backup data of said each data node.

In a possible implementation, the first backup unit is further configured to take a data node snapshot for said each data node at the first time point, and record currently imported data of said each data node as the full backup data.

In a possible implementation, the first determination unit is further configured to: acquire an incremental log of said each data node based on the first time point; and determine prepare time points and commit time points of a plurality of branch transactions based on the incremental log of said each data node, and determine the trust divergence time point for the first time point based on the prepare time points and the commit time points of the plurality of branch transactions.

In a possible implementation, the first determination unit is further configured to: determine branch transaction commit durations based on the prepare time points and the commit time points of the plurality of branch transactions; acquire a branch transaction commit duration longer than a predetermined time length, and record a prepare time point and a commit time point of a branch transaction corresponding to the branch transaction commit duration into a branch transaction time-consumption table; and determine the trust divergence time point for the first time point based on the branch transaction time-consumption table.

In a possible implementation, the first determination unit is further configured to: search the branch transaction time-consumption table for any branch transaction matching a predetermined condition, where the predetermined condition is that the prepare time point is prior to t1-s and the commit time point is later than t1, t1 being the first time point and s being the predetermined time length; where in case at least one transaction matching the predetermined condition is present in the branch transaction time-consumption table, an earliest prepare time point is selected for the at least one branch transaction matching the predetermined condition to serve as the trust divergence time point for the first time point; and where in case no branch transaction matching the predetermined condition is present in the branch transaction time-consumption table, the trust divergence time point for the first time point is determined as t1-s, t1 being the first time point and s being the predetermined time length.

In a fourth aspect, provided is another apparatus for performing a full backup for a distributed database system including a plurality of data nodes. The apparatus includes: a second backup unit configured to perform a full backup for each data node in the distributed database system at a second time point to acquire full backup data, and determine a finish time point of the full backup as a third time point; a second determination unit configured to determine a trust divergence time point for the second time point, where all transactions in prepared states prior to the trust divergence time point are enabled to be committed or rolled back before the second time point; a second acquisition unit configured to acquire a second incremental log set of said each data node between the trust divergence time point and a fourth time point, where the fourth time point is any time point after the third time point; and a second replay unit configured to perform a fault-tolerant replay of the second incremental log set on the second full backup data.

In a possible implementation, the second determination unit is further configured to: acquire an incremental log of said each data node based on the second time point; and determine prepare time points and commit time points of a plurality of branch transactions based on the incremental log of said each data node, and determine the trust divergence time point for the second time point based on the prepare time points and the commit time points of the plurality of branch transactions.

In a possible implementation, the second determination unit is further configured to: determine branch transaction commit durations based on the prepare time points and the commit time points of the plurality of branch transactions; acquire a branch transaction commit duration longer than a predetermined time length, and record a prepare time point and a commit time point of a branch transaction corresponding to the branch transaction commit duration into a branch transaction time-consumption table; and determine the trust divergence time point for the second time point based on the branch transaction time-consumption table.

In a possible implementation, the second determination unit is further configured to: search the branch transaction time-consumption table for any branch transaction matching a predetermined condition, where the predetermined condition is that the prepare time point is prior to t2-s and the commit time point is later than t2, t2 being the second time point and s being the predetermined time length; where in case at least one branch transaction matching the predetermined condition is present in the branch transaction time-consumption table, an earliest prepare time point is selected for the at least one branch transaction matching the predetermined condition to serve as the trust divergence time point for the second time point; and where in case no branch transaction matching the predetermined condition is present in the branch transaction time-consumption table, the trust divergence time point for the second time point is determined as t2-s, t2 being the second time point and s being the predetermined time length.

In a possible implementation, the second replay unit is further configured to perform write conflict processing on recorded data during the replay.

In a fifth aspect, provided is an apparatus for performing a full backup for a distributed database system. The apparatus includes: at least one processor, and a memory communicatively connected to the at least one processor, the memory having instructions executable by the at least one processor stored therein, where the instructions, when executed by the at least one processor, cause the at least one processor to implement the method according to the first aspect or the method according to the second aspect.

In a sixth aspect, provided is a computer-readable storage medium having programs stored thereon, where the programs, when executed by a multicore processor, cause the multicore processor to implement the method according to the first aspect or the method according to the second aspect.

According to at least one of the aforesaid technical solutions, implementations of the present disclosure can achieve the following beneficial effects. The branch transaction, which is currently in a prepared state but has not been committed or rolled back, can be imported when the full backup is performed on each data node in the distributed database system.

It should be understood that the aforesaid description only shows a summary of the technical solutions of the present disclosure to facilitate better understanding of technical means of the present disclosure for implementing the present disclosure in accordance with the content described in the specification. Specific embodiments of the present disclosure will be given below to make the above and other objects, features, and advantages of the present disclosure more apparent.

BRIEF DESCRIPTION OF THE DRAWINGS

By reading following details of the exemplary embodiments below, those of ordinary skills in the art may understand the advantages and benefits described herein and other advantages and benefits. The accompanying drawings are for the purpose of illustrating exemplary embodiments only and are not intended to be a limitation of the present disclosure. Further, a same reference sign is adopted to indicate a same component throughout the accompanying drawings. In the accompanying drawings.

In the accompanying drawings, the same or corresponding reference signs indicate same or corresponding portions.

DETAILED DESCRIPTION

Exemplary embodiments of the present disclosure will be described below in more details with reference to the accompanying drawings. Although the accompanying drawings illustrate exemplary embodiments of the present disclosure, it should be understood that the present disclosure can be implemented in various forms and should not be construed as limited to embodiments described herein. Rather, these embodiments are provided so that the present disclosure will be understood thoroughly, and will fully convey the scope of the present disclosure to those skilled in the art.

In the present disclosure, it should be understood that terms such as "include" or "have" are intended to indicate the existence of the characteristics, figures, steps, actions, components, parts disclosed by the specification or any combination thereof, without excluding the existence of one or more other characteristics, figures, steps, actions, components, parts or any combination thereof.

Furthermore, it should be noted that, in case of no conflict, the embodiments of the present disclosure and features of the embodiments may be combined with each other in any manner. The present disclosure will be described in detail below with reference to the accompanying drawings and embodiments.

It will be understood by those skilled in the art that the application scenario described is only an example in which an embodiment of the present disclosure may be implemented. The application scope of implementations of the present disclosure is not limited in any way. After basic principles of the present disclosure, various non-limiting implementations of the present disclosure will be described specifically below.

Figure 1:
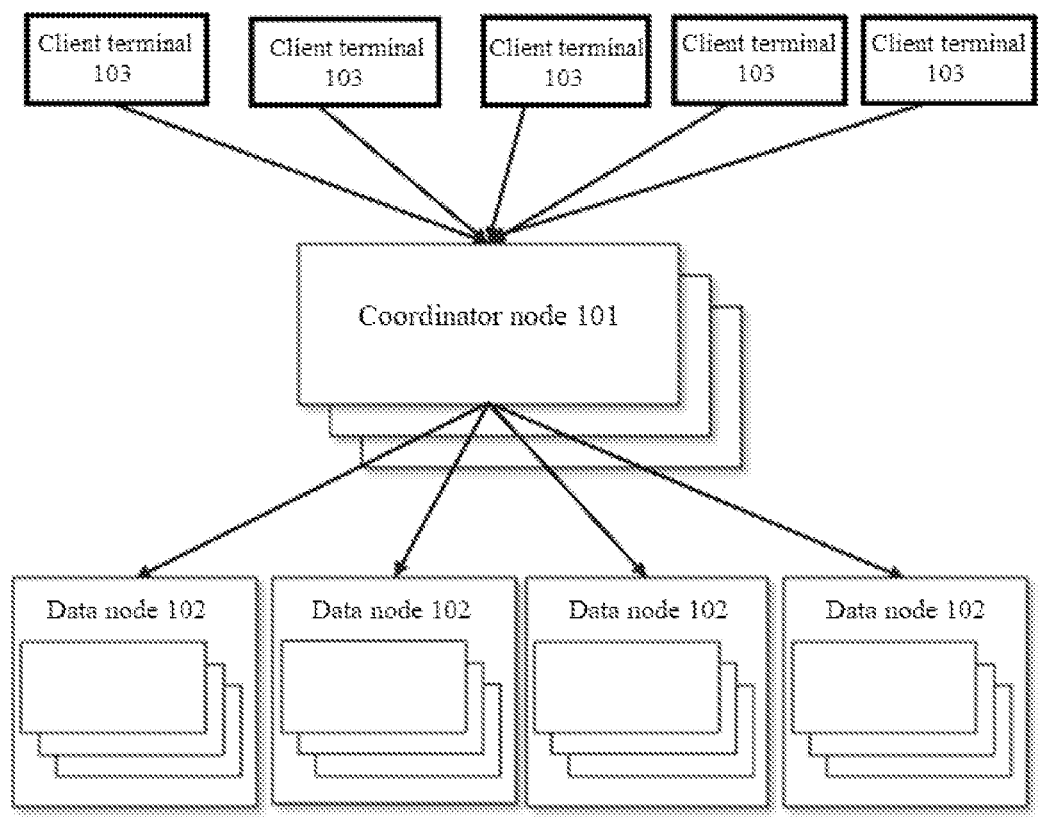
FIG. 1 is a schematic diagram of a distributed database.
Figure 2:
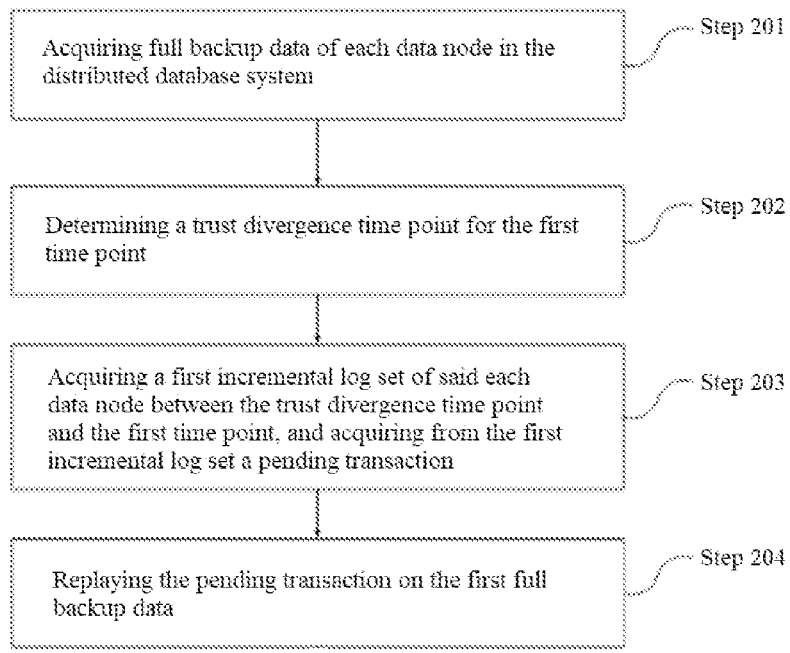
FIG. 2 is a schematic flowchart of a backup method for a distributed database according to an embodiment of the present disclosure.

FIG. 2 is a schematic flowchart of a backup method 200 for a distributed database according to an embodiment of the present disclosure. In this process, the execution subject may be one or more electronic devices in terms of device; and the execution subject may accordingly be one or more programs installed on the one or more electronic devices in terms of program.

As shown in FIG. 2, the method 200 may include following steps 201 to 204.

Step 201: full backup data of each data node in the distributed database system is acquired.

The full-backup time point corresponding to the full backup data is the first time point t1. In a distributed database, each data node has its own corresponding full backup data, and at a particular moment, the full backup data of each data node contains all the data of said each data node at the particular moment. For example, a first data node may have first full backup data, and a second data node may have second full backup data.

In a possible implementation, step 201 may specifically include: taking a data node snapshot for said each data node at the first time point, and recording currently imported data as the first full backup data.

In an example, the snapshot may be created for each data node at a certain time point. One basic function of the snapshot is the data backup, such that the data in the data node at another time point after completing the snapshot can be restored to a time point when the snapshot is created. At the first time point t1, the data node snapshot is taken for each data node, and the data that has been imported at the first time point t1 is taken as the first full backup data. The transactions that are in the prepared states but not committed are generally not recorded into the database when the full backup is performed on each data node. Thus, the first full backup data does not contain the data of transactions, which are in the prepared states at the first time point t1 but not committed, of each data node.

Step 202: a trust divergence time point a is determined for the first time point t1. The trust divergence time point a prior to the first time point t1 is determined so that all transactions in the prepared states prior to the trust divergence time point a are enabled to be committed or rolled back before the first time point t1.

In a possible implementation, step 202 further includes: acquiring an incremental log of said each data node based on the first time point t1; and determining prepare time points and commit time points of a plurality of branch transactions based on the incremental log of said each data node, and determining the trust divergence time point for the first time point based on the prepare time points and the commit time points of the plurality of branch transactions. Specifically, the prepare time point of the branch transaction is namely the time point at which the branch transaction enters the prepared state when the two-phase commit protocol is used, and the commit time point of the branch transaction is namely the time point at which the branch transaction in the prepared state is committed.

Each data node may acquire the trust divergence time point a for the first time point t1 by calculation and analysis based on the prepare time points and commit time points of the branch transactions as executed. In terms of the trust divergence time point a for the first time point t1 of the data node, all branch transactions in the prepared states prior to the trust divergence time point a must be determined to be committed or rolled back based on the incremental log before the first time point t1; whereas, for the branch transactions in the prepared states between the trust divergence time point a and the first time point t1, the final states of the transactions may fail to be determined based on the incremental log before the first time point t1.

In a possible implementation, step 202 further includes: determining branch transaction commit durations based on the prepare time points and the commit time points of the plurality of branch transactions; acquiring a branch transaction commit duration longer than a predetermined time length, and recording a prepare time point and a commit time point of a branch transaction corresponding to the branch transaction commit duration into a branch transaction time-consumption table; and determining the trust divergence time point for the first time point t1 based on the branch transaction time-consumption table. Optionally, a branch transaction time-consumption table may be maintained on each data node, or each data node may jointly maintain a branch transaction time-consumption table to calculate the trust divergence time point on the data node for the first time point.

In a possible implementation, determining the trust divergence time point for the first time point based on the branch transaction time-consumption table includes following procedures. Firstly, the branch transaction time-consumption table is searched for any transaction matching a predetermined condition, where the predetermined condition herein is that the prepare time point is prior to t1-s and the commit time point is later than t1, with t1 being the first time point and s being the predetermined time length acquired by experience. Then, in case at least one branch transaction matching the predetermined condition is present in the branch transaction time-consumption table, an earliest prepare time point of the at least one transaction matching the predetermined condition is determined as the trust divergence time point for the first time point; and in case no branch transaction matching the predetermined condition is present in the branch transaction time-consumption table, the trust divergence time point for the first time point is determined as t1-s, with t1 being the first time point and s being the predetermined time length. Based on the analysis, it can be seen that the pending transaction that enters the prepared state but is not committed or rolled back may only exist after the trust divergence time point. Optionally, the trust divergence time point may also be any time point before the earliest prepare time point of the corresponding branch transaction matching the predetermined condition.

Step 203: a first incremental log set of said each data node between the trust divergence time point and the first time point is determined, and a pending transaction that is in the prepared state but not committed or rolled back is acquired from the first incremental log set.

Step 204: the pending transaction on the first full backup data is replayed.

According to aspects of the aforesaid embodiments, transactions in the prepared states can be recorded into the database while performing the full backup for each data node.

Figure 3:
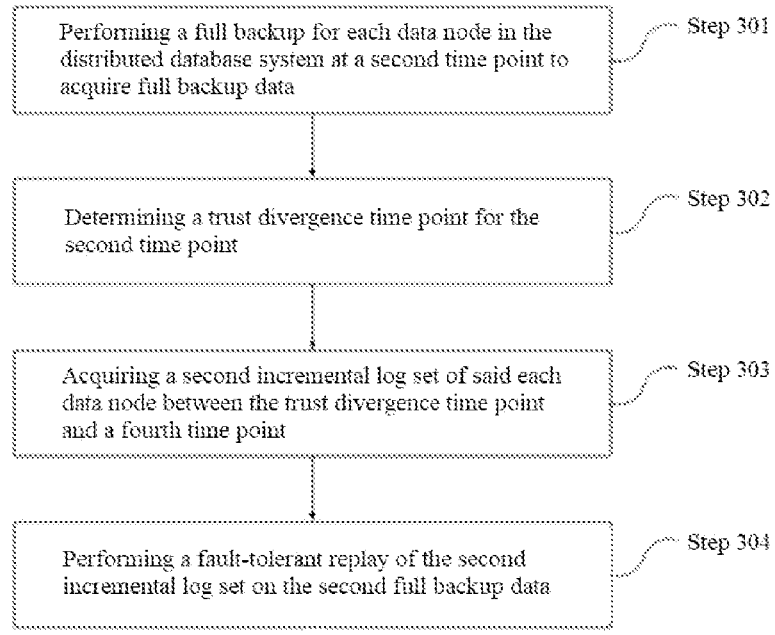
FIG. 3 is a schematic flowchart of a backup method for a distributed database according to another embodiment of the present disclosure.

FIG. 3 is a schematic flowchart of a backup method 300 for a distributed database according to an embodiment of the present disclosure. In this process, the execution subject may be one or more electronic devices in terms of device; and the execution subject may accordingly be one or more programs installed on the one or more electronic devices in terms of program.

As shown in FIG. 3, the method 300 may include following steps 301 to 304.

Step 301: a full backup is performed for each data node in the distributed database system at a second time point t2 to acquire full backup data, and a finish time point of the full backup is determined as a third time point t3.

The data backup (e.g., export based on the table) of each data node is started at the second time point t2, and the time point when the data backup is completed is recorded as the third time point t3. In the distributed database, each data node has its own corresponding full backup data.

Step 302: a trust divergence time point b is determined for the second time point t2, where all transactions in the prepared states prior to the trust divergence time point b are enabled to be committed or rolled back before the second time point.

Each data node may acquire the trust divergence time point b for the second time point t2 by calculation and analysis based on the prepare time points and commit time points of the branch transactions as executed. In terms of the trust divergence time point b for the second time point t2 of the data node, all branch transactions in the prepared states prior to the trust divergence time point b must be determined to be committed or rolled back based on the incremental log before the second time point t2; whereas, for the branch transactions in the prepared states between the trust divergence time point b and the second time point t2, the final states of the transactions may fail to be determined based on the incremental logs before the second time point t2.

In a possible implementation, step 302 further includes: acquiring an incremental log of said each data node based on the second time point t2; and determining prepare time points and commit time points of a plurality of branch transactions based on the incremental log of said each data node, and determining the trust divergence time point for the second time point based on the prepare time points and the commit time points of the plurality of branch transactions.

In an example, the prepare time points and the commit time points of the plurality of branch transactions corresponding to the first data node are acquired based on the incremental log of the first data node; then, several branch transactions whose prepare time points are prior to the second time point and whose commit time points are later than the second time point are selected, and the earliest prepare time point is selected therefrom to serve as the trust divergence time point.

In a possible implementation, determining the trust divergence time point for the second time point based on the prepare time points and the commit time points of the plurality of branch transactions further includes: determining branch transaction commit durations based on the prepare time points and the commit time points of the plurality of branch transactions; acquiring a branch transaction commit duration longer than a predetermined time length, and recording a prepare time point and a commit time point of a branch transaction corresponding to the branch transaction commit duration into a branch transaction time-consumption table; and determining the trust divergence time point for the second time point based on the branch transaction time-consumption table. Optionally, a branch transaction time-consumption table may be maintained on each data node, or each data node may jointly maintain a branch transaction time-consumption table to calculate the trust divergence time point b on the data node for the second time point t2.

In a possible implementation, determining the trust divergence time point for the second time point based on the branch transaction time-consumption table includes: searching the branch transaction time-consumption table for any branch transaction matching a predetermined condition. The predetermined condition herein is that the prepare time point is prior to t2-s and the commit time point is later than t2, with t2 being the second time point and s being the predetermined time length. Then, in case at least one branch transaction matching the predetermined condition is present in the branch transaction time-consumption table, an earliest prepare time point of the at least one branch transaction matching the predetermined condition is determined as the trust divergence time point for the second time point; and in case no branch transaction matching the predetermined condition is present in the branch transaction time-consumption table, the trust divergence time point for the second time point is determined as t2-s, with t2 being the first time point and s being the predetermined time length. Based on the analysis, it can be seen that the pending transaction that enters the prepared state but is not committed or rolled back may only exist after the trust divergence time point. Optionally, the trust divergence time point may also be any time point before the earliest prepare time point of the corresponding branch transaction matching the predetermined condition.

Step 303: a second incremental log set of said each data node between the trust divergence time point b and a fourth time point t4 is determined, where the fourth time point t4 is any time point after the third time point t3.

Step 304: a fault-tolerant replay of the second incremental log set is performed on the second full backup data.

In a possible implementation, the fault-tolerant replay may include performing write conflict processing on recorded data during the replay, which ignores operations such as duplicate insertions and thereby avoids adverse effects caused by executing the data repeatedly.

According to aspects of the aforesaid embodiments, transactions in the prepared states may be recorded into the database while performing a full backup for each data node, so as to achieve the full backup.

Figure 4:
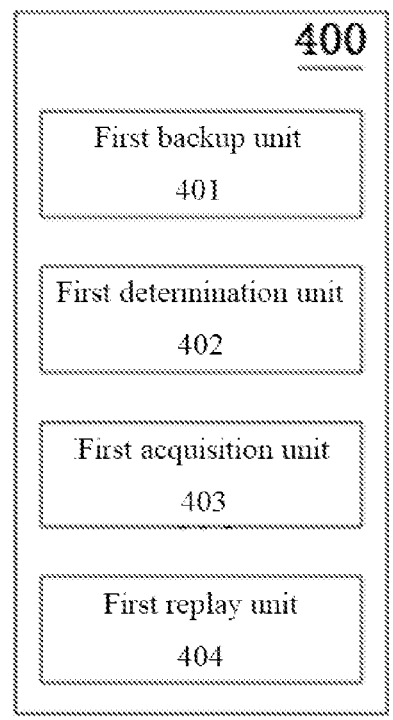
FIG. 4 is a schematic structural diagram of a backup apparatus for a distributed database according to an embodiment of the present disclosure.

In a possible implementation, based on the same technical idea, embodiments of the present disclosure further provide a backup apparatus for a distributed database to perform the backup method for the distributed database provided in FIG. 2. FIG. 4 is a schematic structural diagram of a backup apparatus for a distributed database according to an embodiment of the present disclosure.

As shown in FIG. 4, the apparatus 400 includes:
- a first backup unit 401 configured to acquire full backup data of each data node in the distributed database system, with a full-backup time point corresponding to the full backup data being a first time point;
- a first determination unit 402 configured to determine a trust divergence time point for the first time point, where all transactions in prepared states prior to the trust divergence time point are enabled to be committed or rolled back before the first time point;
- a first acquisition unit 403 configured to acquire a first incremental log set of said each data node between the trust divergence time point and the first time point, and acquire from the first incremental log set a pending transaction of said each data node, the pending transaction being in the prepared state but not committed or rolled back; and
- a first replay unit 404 configured to replay the pending transaction of said each data node on the full backup data of said each data node.

In a possible implementation, the first backup unit 401 is further configured to take a data node snapshot for said each data node at the first time point, and record currently imported data of said each data node as the full backup data.

In a possible implementation, the first determination unit 402 is further configured to: acquire an incremental log of said each data node based on the first time point; and determine prepare time points and commit time points of a plurality of branch transactions based on the incremental log of said each data node, and determine the trust divergence time point for the first time point based on the prepare time points and the commit time points of the plurality of branch transactions.

In a possible implementation, the first determination unit 402 is further configured to: determine branch transaction commit durations based on the prepare time points and the commit time points of the plurality of branch transactions; acquire a branch transaction commit duration longer than a predetermined time length, and record a prepare time point and a commit time point of a branch transaction corresponding to the branch transaction commit duration into a branch transaction time-consumption table; and determine the trust divergence time point for the first time point based on the branch transaction time-consumption table.

In a possible implementation, the first determination unit 402 is further configured to: search the branch transaction time-consumption table for any branch transaction matching a predetermined condition. The predetermined condition herein is that the prepare time point is prior to t1-s and the commit time point is later than t1, t1 being the first time point and s being the predetermined time length. In case at least one branch transaction matching the predetermined condition is present in the branch transaction time-consumption table, an earliest prepare time point is selected for the at least one branch transaction matching the predetermined condition to serve as the trust divergence time point for the first time point; and in case no branch transaction matching the predetermined condition is present in the branch transaction time-consumption table, the trust divergence time point for the first time point is determined as t1-s, t1 being the first time point and s being the predetermined time length.

Figure 5:
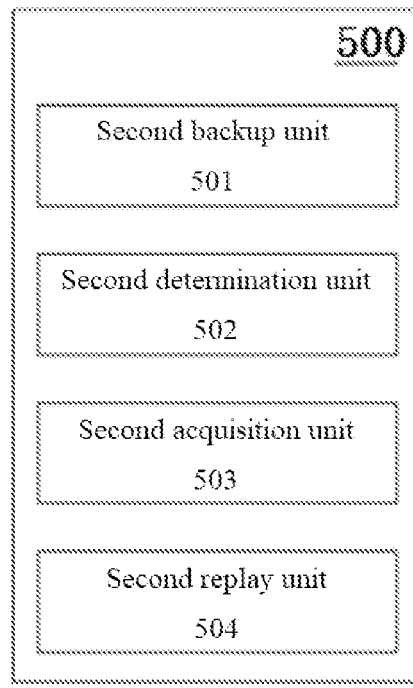
FIG. 5 is a schematic structural diagram of a backup apparatus for a distributed database according to another embodiment of the present disclosure.

In a possible implementation, based on the same technical idea, embodiments of the present disclosure further provide another backup apparatus for a distributed database to perform the backup method for the distributed database provided in FIG. 3. FIG. 5 is a schematic structural diagram of a backup apparatus for a distributed database according to an embodiment of the present disclosure.

As shown in FIG. 5, the apparatus 500 includes:
- a second backup unit 501 configured to perform a full backup for each data node in the distributed database system at a second time point to acquire full backup data, and determine a finish time point of the full backup as a third time point;
- a first determination unit 502 configured to determine a trust divergence time point for the second time point, where all transactions in prepared states prior to the trust divergence time point are enabled to be committed or rolled back before the second time point;
- a second acquisition unit 503 configured to acquire a second incremental log set of said each data node between the trust divergence time point and a fourth time point, the fourth time point herein being any time point after the third time point; and
- a second replay unit 504 configured to perform a fault-tolerant replay of the second incremental log set on the second full backup data.

In a possible implementation, the second determination unit is further configured to: acquire an incremental log of said each data node based on the second time point; and determine prepare time points and commit time points of a plurality of branch transactions based on the incremental log of said each data node, and determine the trust divergence time point for the second time point based on the prepare time points and the commit time points of the plurality of branch transactions.

In a possible implementation, the second determination unit 502 is further configured to: determine branch transaction commit durations based on the prepare time points and the commit time points of the plurality of branch transactions; acquire a branch transaction commit duration longer than a predetermined time length, and record a prepare time point and a commit time point of a branch transaction corresponding to the branch transaction commit duration into a branch transaction time-consumption table; and determine the trust divergence time point for the second time point based on the branch transaction time-consumption table.

In a possible implementation, the second determination unit 502 is further configured to: search the branch transaction time-consumption table for any branch transaction matching a predetermined condition. The predetermined condition herein is that the prepare time point is prior to t2-s and the commit time point is later than t2, t2 being the second time point and s being the predetermined time length. In case at least one branch transaction matching the predetermined condition is present in the branch transaction time-consumption table, an earliest prepare time point is selected for the at least one branch transaction matching the predetermined condition to serve as the trust divergence time point for the second time point; and in case no branch transaction matching the predetermined condition is present in the branch transaction time-consumption table, the trust divergence time point for the second time point is determined as t2-s, t2 being the second time point and s being the predetermined time length.

In a possible implementation, the second replay unit 504 is further configured to perform write conflict processing on recorded data during the replay.

It should be noted that the apparatus for performing a full backup for the distributed database system according to embodiments of the present disclosure can achieve each process in the aforementioned embodiments of the method of performing a full backup for the distributed database system, and can also achieve the same effect and function, which will not be repeated here.

Figure 6:
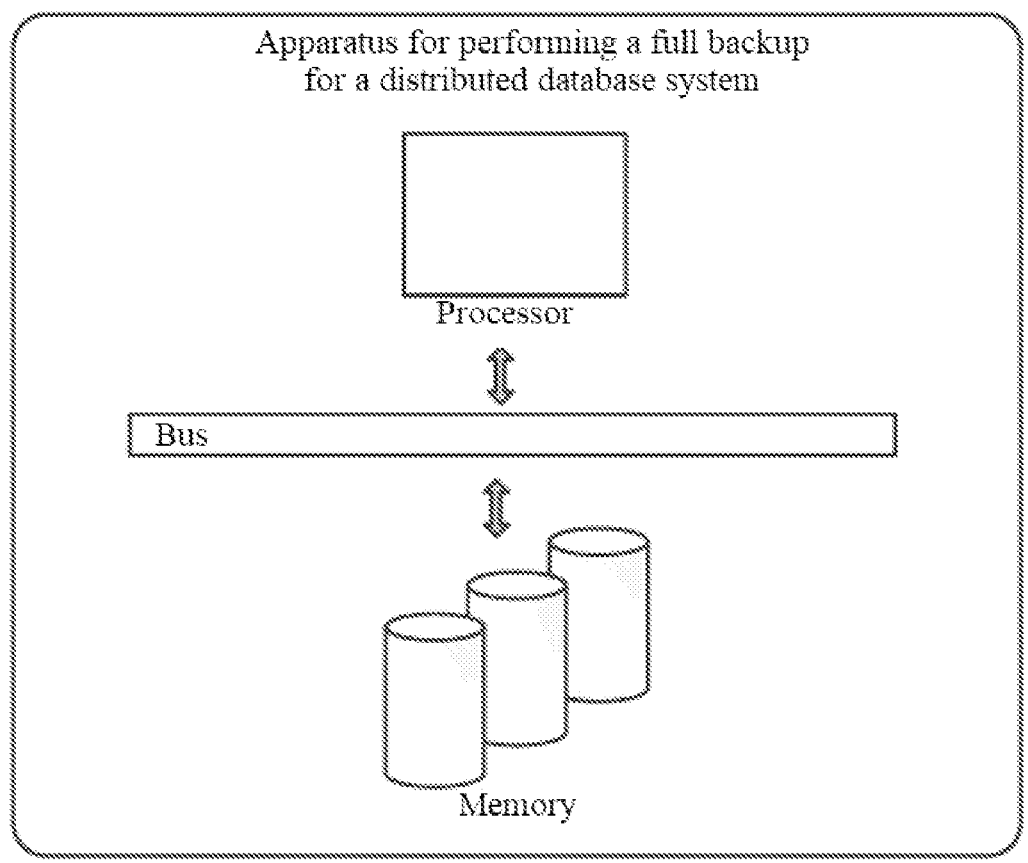
FIG. 6 is a schematic structural diagram of a backup apparatus for a distributed database according to still another embodiment of the present disclosure.

FIG. 6 shows an apparatus for performing a full backup for a distributed database system according to an embodiment of the present disclosure for executing the method of performing a full backup for the distributed database system shown in FIG. 2 or FIG. 3. The apparatus includes at least one processor, and a memory communicatively connected to the at least one processor. The memory has instructions executable by the at least one processor stored therein, where the instructions, when executed by the at least one processor, cause the at least one processor to implement the data processing method according to the aforesaid embodiments.

According to some embodiments of the present disclosure, a non-volatile computer storage medium for the method of performing a full backup for the distributed database system is provided. The non-volatile computer storage medium has computer-executable instructions stored thereon, where the computer-executable instructions, when executed by the processor, cause the method of performing a full backup for the distributed database system according to the aforesaid embodiments to be implemented.

The respective embodiments of the present disclosure are described in a progressive manner. The reference may be made to each other for the same or similar parts of the respective embodiments, and each embodiment focuses on the differences from other embodiments. Especially, for the embodiments of the apparatus, device and computer-readable storage medium, since they basically correspond to the embodiments of the method, they are described in a simple way, and reference may be made to the description part on embodiments of the method for relevant points.

The apparatus, device and computer-readable storage medium according to embodiments of the present disclosure correspond to the method one by one. Thus, the apparatus, device and computer-readable storage medium have similar beneficial technical effects with the corresponding method. Since the beneficial technical effects of the method have been described in detail above, the beneficial technical effects of the apparatus, device and computer-readable storage medium will not be repeated here.

Those skilled in the art should understand that the embodiments of the present disclosure may be provided as a method, a system, or a computer program product. Therefore, the present disclosure may be in the form of full hardware embodiments, full software embodiments, or a combination thereof. Moreover, the present disclosure may be in the form of a computer program product that is implemented on one or more computer-usable storage medium (which includes, but is not limited to, magnetic disk storage, CD-ROM, optical storage) containing computer-usable program codes.

The present disclosure is described referring to the flowchart and/or block diagram of the method, device (system) and computer program product according to the embodiments of the present disclosure. It should be understood that, each flow and/or block in the flowchart and/or block diagram and the combination of flow and/or block in the flowchart and/or block diagram may be realized via computer program instructions. Such computer program instructions may be provided to the processor of a general-purpose computer, special-purpose computer, a built-in processor or other programmable data processing devices to produce a machine, such that the instructions executed by the processor of a computer or other programmable data processing devices may produce a device for realizing the functions specified in one or more flows in the flowchart and/or one or more blocks in the block diagram.

Such computer program instructions may also be stored in a computer-readable storage that can guide a computer or other programmable data processing devices to work in a specific mode, such that the instructions stored in the computer-readable storage may produce a manufacture including a commander equipment, where the commander equipment may realize the functions specified in one or more flows of the flowchart and one or more blocks in the block diagram.

Such computer program instructions may also be loaded to a computer or other programmable data processing devices, such that a series of operational processes may be executed on the computer or other programmable devices to produce a computer-realized processing, and thereby the instructions executed on the computer or other programmable devices may provide a process for realizing the functions specified in one or more flows in the flowchart and/or one or more blocks in the block diagram.

In a typical configuration, the computing device includes one or more processors (CPU), an input/output interface, a network interface, and a memory.

The memory may include a non-permanent memory in a computer-readable medium, a random access memory (RAM) and/or a non-volatile memory, such as a read-only memory (ROM) or a flash memory (flash RAM). The memory is an example of a computer-readable medium.

The computer-readable medium may be permanent and non-permanent, or removable and non-removable media, which can achieve the information storage by any method or technology. The information may be computer-readable instructions, data structures, program modules, or other data. Examples of the computer storage medium include, but are not limited to, a phase change memory (PRAM), a static random access memory (SRAM), a dynamic random access memory (DRAM), other types of random access memory (RAM), read-only memory (ROM), an electrically erasable programmable read-only memory (EEPROM), a flash memory or other memory technologies, a CD-ROM, a digital versatile disc (DVD) or other optical storage, and a magnetic cassette tape. The magnetic tape storage or other magnetic storage devices or any other non-transmission medium may be configured to store information that can be accessed by computing devices. Furthermore, although the operations of the method of the present disclosure are described in a specific order in drawings, it does not require or imply that the operations must be performed in the specific order, or that the desired result can only be achieved if all the operations as shown are performed. Additionally or alternatively, some steps may be omitted, multiple steps may be combined into one step for execution, and/or one step may be decomposed into multiple steps for execution.

Although the spirit and principles of the present disclosure have been described with reference to several embodiments, it shall be understood that the present disclosure is not limited to the embodiments as disclosed, nor does the division of the aspects imply that the features in those aspects cannot be combined for benefit, such division being for convenience of presentation only. The present disclosure is intended to cover various modifications and equivalent arrangements included within the spirit and scope of the appended claims.

What is claimed is:

1. A method of performing a full backup for a distributed database system comprising a plurality of data nodes, the method comprising:
    acquiring full backup data of each data node in the distributed database system, with a full-backup time point corresponding to the full backup data being a first time point;
    determining a trust divergence time point for the first time point, wherein all transactions in prepared states prior to the trust divergence time point are enabled to be committed or rolled back before the first time point;
    acquiring a first incremental log set of said each data node between the trust divergence time point and the first time point;
    acquiring from the first incremental log set a pending transaction of said each data node, the pending transaction being in a prepared state but not committed or rolled back; and
    replaying the pending transaction of said each data node on the full backup data of said each data node.

2. The method according to claim 1, wherein acquiring the full backup data of each data node in the distributed database system comprises:

taking a data node snapshot for said each data node at the first time point, and recording currently imported data of said each data node as the full backup data.

3. The method according to claim 1, wherein determining the trust divergence time point for the first time point comprises:
acquiring an incremental log of said each data node based on the first time point; and
determining prepare time points and commit time points of a plurality of branch transactions based on the incremental log of said each data node, and determining the trust divergence time point for the first time point based on the prepare time points and the commit time points of the plurality of branch transactions.

4. The method according to claim 3, further comprising:
determining branch transaction commit durations based on the prepare time points and the commit time points of the plurality of branch transactions;
acquiring a branch transaction commit duration longer than a predetermined time length, and recording a prepare time point and a commit time point of a branch transaction corresponding to the branch transaction commit duration into a branch transaction time-consumption table; and
determining the trust divergence time point for the first time point based on the branch transaction time-consumption table.

5. The method according to claim 4, wherein determining the trust divergence time point for the first time point based on the branch transaction time-consumption table comprises:
searching the branch transaction time-consumption table for any branch transaction matching a predetermined condition, wherein the predetermined condition is that the prepare time point is prior to t1-s and the commit time point is later than t1, t1 being the first time point and s being the predetermined time length;
wherein in case at least one branch transaction matching the predetermined condition is present in the branch transaction time-consumption table, an earliest prepare time point is selected for the at least one branch transaction matching the predetermined condition to serve as the trust divergence time point for the first time point; and
wherein in case no branch transaction matching the predetermined condition is present in the branch transaction time-consumption table, the trust divergence time point for the first time point is determined as t1-s, t1 being the first time point and s being the predetermined time length.

6. A method of performing a full backup for a distributed database system comprising a plurality of data nodes, comprising:
performing a full backup for each data node in the distributed database system at a second time point to acquire full backup data, and determining a finish time point of the full backup as a third time point;
determining a trust divergence time point for the second time point, wherein all transactions in prepared states prior to the trust divergence time point are enabled to committed or rolled back before the second time point;
acquiring a second incremental log set of said each data node between the trust divergence time point and a fourth time point, wherein the fourth time point is any time point after the third time point; and
performing a fault-tolerant replay of the second incremental log set on the second full backup data.

7. The method according to claim 6, wherein determining the trust divergence time point for the second time point comprises:
acquiring an incremental log of said each data node based on the second time point; and
determining prepare time points and commit time points of a plurality of branch transactions based on the incremental log of said each data node, and determining the trust divergence time point for the second time point based on the prepare time points and the commit time points of the plurality of branch transactions.

8. The method according to claim 7, further comprising:
determining branch transaction commit durations based on the prepare time points and the commit time points of the plurality of branch transactions;
acquiring a branch transaction commit duration longer than a predetermined time length, and recording a prepare time point and a commit time point of a branch transaction corresponding to the branch transaction commit duration into a branch transaction time-consumption table; and
determining the trust divergence time point for the second time point based on the branch transaction time-consumption table.

9. The method according to claim 8, wherein determining the trust divergence time point for the second time point based on the branch transaction time-consumption table comprises:
searching the branch transaction time-consumption table for any branch transaction matching a predetermined condition, wherein the predetermined condition is that the prepare time point is prior to t2-s and the commit time point is later than t2, t2 being the second time point and s being the predetermined time length;
wherein in case at least one transaction matching the predetermined condition is present in the branch transaction time-consumption table, an earliest prepare time point is selected for the at least one branch transaction matching the predetermined condition to serve as the trust divergence time point for the second time point; and
wherein in case no branch transaction matching the predetermined condition is present in the branch transaction time-consumption table, the trust divergence time point for the second time point is determined as t2-s, t2 being the second time point and s being the predetermined time length.

10. The method according to claim 6, wherein performing the fault-tolerant replay of the second incremental log set on the second full backup data comprises:
performing write conflict processing on recorded data during the replay.

11. An apparatus for performing a full backup for a distributed database system comprising a plurality of data nodes, comprising:
a first backup unit configured to acquire full backup data of said each data node in the distributed database system, with a full-backup time point corresponding to the full backup data being a first time point;
a first determination unit configured to determine a trust divergence time point for the first time point, wherein all transactions in prepared states prior to the trust divergence time point are enabled to be committed or rolled back before the first time point;
a first acquisition unit configured to acquire a first incremental log set of said each data node between the trust divergence time point and the first time point, and acquire from the first incremental log set a pending transaction of said each data node, the pending transaction being in a prepared state but not committed or rolled back; and a first replay unit configured to replay the pending transaction of said each data node on the full backup data of said each data node.

12. The apparatus according to claim 11, wherein the first backup unit is further configured to:

take a data node snapshot for said each data node at the first time point, and record currently imported data of said each data node as the full backup data.

13. The apparatus according to claim 11, wherein the first determination unit is further configured to:

acquire an incremental log of said each data node based on the first time point; and determine prepare time points and commit time points of a plurality of branch transactions based on the incremental log of said each data node, and determine the trust divergence time point for the first time point based on the prepare time points and the commit time points of the plurality of branch transactions.

14. The apparatus according to claim 13, wherein the first determination unit is further configured to:

determine branch transaction commit durations based on the prepare time points and the commit time points of the plurality of branch transactions;

acquire a branch transaction commit duration longer than a predetermined time length, and record a prepare time point and a commit time point of a branch transaction corresponding to the branch transaction commit duration into a branch transaction time-consumption table; and determine the trust divergence time point for the first time point based on the branch transaction time-consumption table.

15. The apparatus according to claim 14, wherein the first determination unit is further configured to:

search the branch transaction time-consumption table for any branch transaction matching a predetermined condition, wherein the predetermined condition is that the prepare time point is prior to t1-s and the commit time point is later than t1, t1 being the first time point and s being the predetermined time length;

wherein in case at least one branch transaction matching the predetermined condition is present in the branch transaction time-consumption table, an earliest prepare time point is selected for the at least one branch transaction matching the predetermined condition to serve as the trust divergence time point for the first time point; and wherein in case no branch transaction matching the predetermined condition is present in the branch transaction time-consumption table, the trust divergence time point for the first time point is determined as t1-s, t1 being the first time point and s being the predetermined time length.

16. An apparatus for performing a full backup for a distributed database system comprising a plurality of data nodes, comprising:

a second backup unit configured to perform a full backup for each data node in the distributed database system at a second time point to acquire full backup data, and determine a finish time point of the full backup as a third time point;

a second determination unit configured to determine a trust divergence time point for the second time point, wherein all transactions in prepared states prior to the trust divergence time point are enabled to be committed or rolled back before the second time point;

a second acquisition unit configured to acquire a second incremental log set of said each data node between the trust divergence time point and a fourth time point, wherein the fourth time point is any time point after the third time point; and a second replay unit configured to perform a fault-tolerant replay of the second incremental log set on the second full backup data.

17. The apparatus according to claim 16, wherein the second determination unit is further configured to:

acquire an incremental log of said each data node based on the second time point; and determine prepare time points and commit time points of a plurality of branch transactions based on the incremental log of said each data node, and determine the trust divergence time point for the second time point based on the prepare time points and the commit time points of the plurality of branch transactions.

18. The apparatus according to claim 17, wherein the second determination unit is further configured to:

determine branch transaction commit durations based on the prepare time points and the commit time points of the plurality of branch transactions;

acquire a branch transaction commit duration longer than a predetermined time length, and record a prepare time point and a commit time point of a branch transaction corresponding to the branch transaction commit duration into a branch transaction time-consumption table; and determine the trust divergence time point for the second time point based on the branch transaction time-consumption table.

19. The apparatus according to claim 18, wherein the second determination unit is further configured to:

search the branch transaction time-consumption table for any branch transaction matching a predetermined condition, wherein the predetermined condition is that the prepare time point is prior to t2-s and the commit time point is later than t2, t2 being the second time point and s being the predetermined time length;

wherein in case at least one branch transaction matching the predetermined condition is present in the branch transaction time-consumption table, an earliest prepare time point is selected for the at least one branch transaction matching the predetermined condition to serve as the trust divergence time point for the second time point; and wherein in case no branch transaction matching the predetermined condition is present in the branch transaction time-consumption table, the trust divergence time point for the second time point is determined as t2-s, t2 being the second time point and s being the predetermined time length.

20. The apparatus according to claim 16, wherein the second replay unit is further configured to:

perform write conflict processing on recorded data during the replay.

* * * * *